(12) United States Patent
Vollmer et al.

(10) Patent No.: US 6,856,603 B1
(45) Date of Patent: Feb. 15, 2005

(54) PROCESS, CONTROL CENTER, AND TERMINAL EQUIPMENT FOR TRANSMITTING MESSAGES TO TERMINAL EQUIPMENT IN A TELECOMMUNICATIONS SYSTEM

(75) Inventors: Vasco Vollmer, Gartow (DE); Markus Radimirsch, Laatzen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/531,033

(22) Filed: Mar. 20, 2000

(30) Foreign Application Priority Data

Mar. 19, 1999 (DE) .......................................... 199 12 547

(51) Int. Cl.[7] .............................................. G08C 17/00
(52) U.S. Cl. ...................................... 370/311; 370/574
(58) Field of Search .............................. 370/311, 335, 370/347, 390, 432, 338; 455/517, 574, 522

(56) References Cited

U.S. PATENT DOCUMENTS

| | | | |
|---|---|---|---|
| 5,604,744 A | | 2/1997 | Andersson et al. |
| 5,745,860 A | * | 4/1998 | Kallin ........................ 455/574 |
| 5,881,055 A | * | 3/1999 | Kondo ........................ 370/311 |
| 5,940,771 A | * | 8/1999 | Gollnick et al. ............. 455/517 |
| 5,959,989 A | * | 9/1999 | Gleeson et al. ............. 370/390 |
| 6,058,289 A | * | 5/2000 | Gardner et al. ............. 340/7.32 |
| 6,240,304 B1 | * | 5/2001 | Blankenstein et al. ...... 455/574 |
| 6,463,307 B1 | * | 10/2002 | Larsson et al. ............. 455/574 |
| 6,483,832 B1 | * | 11/2002 | Civanlar et al. ............ 370/390 |
| 6,600,743 B1 | * | 7/2003 | Lee et al. .................... 370/390 |

FOREIGN PATENT DOCUMENTS

| | | |
|---|---|---|
| DE | 44 42 410 | 5/1996 |
| DE | 197 26 120 | 12/1998 |
| EP | 0 428 126 | 5/1991 |
| EP | 0 642 287 | 3/1995 |
| WO | 96/13134 | 5/1996 |
| WO | 97/20401 | 6/1997 |
| WO | 97/35444 | 9/1997 |
| WO | 99/01998 | 1/1999 |
| WO | 99/08468 | 2/1999 |

* cited by examiner

*Primary Examiner*—Ajit Patel
(74) *Attorney, Agent, or Firm*—Kenyon & Kenyon

(57) ABSTRACT

A process, a control center, and a terminal device are proposed for transmitting messages to terminal devices in a, in particular, wireless, telecommunications system with a control center and with terminal devices. The transmission protocol is frame structured in the time domain. In the transmission protocol, the terminal devices ignore messages from the control center during a single frame, or several consecutive frames. The following steps are carried out in order to transmit a message to one terminal device or to a plurality of terminal devices: First, a number of terminal device groups which includes the majority of the terminal devices are formed by the control center. Each terminal device belongs to exactly one terminal device group and all terminal devices of a terminal device group are ready to receive messages during the same frame. Second, the message that is to be sent is transmitted to each of at least one terminal device group during one possible frame.

21 Claims, 4 Drawing Sheets

| | | | | | | | |
|---|---|---|---|---|---|---|---|
| 21 | ✗ | | | | | | ✓ |
| 22 | ✗ | | | | | | ✓ |
| 23 | ✗ | | | ✗ | | | ✓ |
| 24 | ✗ | | | ✗ | | | ✓ |
| 25 | ✗ | | | ✗ | | | ✓ |
| 26 | ✗ | | ✗ | | ✗ | | ✓ |
| 27 | ✗ | | ✗ | | ✗ | | ✓ |
| 28 | ✗ | ✗ | ✗ | ✗ | ✗ | ✗ | ✓ |
| | 91 | 92 | 93 | 94 | 95 | 96 | 97 |

PROCESS, CONTROL CENTER, AND TERMINAL EQUIPMENT FOR TRANSMITTING MESSAGES TO TERMINAL EQUIPMENT IN A TELECOMMUNICATIONS SYSTEM

FIELD OF THE INVENTION

The present invention relates to a communications system in which several terminals or terminal devices are served by a central station or control center.

BACKGROUND INFORMATION

The control center and the terminal devices communicate with each other preferably by radio. The exchange of information among the components of the telecommunications system occurs by way of a protocol that is structured in the time domain in frames. In this protocol, both the exchange of signaling information and the exchange of useful information occurs with the aid of a sequence of frames, preferably lasting the same length of time. The terminal device must be associated before the terminal device may communicate with the control center. Various parameters are negotiated during such an association. The exchange of information between a terminal and the control center is organized, for example, using a channel access protocol. The channel access protocol is also called Media Access Control (MAC). With regard to the association of a terminal with the control center, it is important that each terminal have a specific MAC address attached to it, by which the terminal is uniquely identified within the domain of the control center.

Communications among the components of a telecommunications system, i.e. both between the control center and a terminal device and between two terminal devices, is carried out by frames. This means communication occurs in accordance with the present invention with the assistance of MAC frames, for example, of a fixed duration. Each of these MAC frames provides transmission capacity in the direction from the terminal devices to the control center (uplink) and in the direction from the control center to the terminal devices (downlink). Moreover, a MAC frame may also provide transmission capacity between various terminal devices (point to point). A process for implementing such frame-based transmission is described in German Published Patent Application No. 197 26 120.

Power-saving devices are used to make a longer operating time possible, particularly in the case of portable terminal devices, for example in Global System for Mobile Communications (GSM) equipment. These devices are easily incorporated into GSM, since GSM is a type of circuit-switched communication. In other words, it has only two states: "connected" and "disconnected." In the "connected" state data are exchanged continuously between the network and the subscriber. In the "disconnected" state the terminal device must regularly determine which base station the terminal device is receiving best and whether an incoming call is waiting for it. Incoming calls are transmitted from all base stations in the roaming area and the terminal device responds to the base station it receives best at the time, so it may take the call. The terminal device itself does not signal until it leaves the roaming area. In this case, it must register in the new roaming area.

The most important features of the power-saving devices as regards the present invention are the following:

The terminal device signals to the control center its desire to enter the sleep mode; a sleep interval parameter describes this desire in greater detail.

The control center responds with a message confirming, if necessary, a different sleep interval parameter.

In accordance with the stipulated sleep interval parameter, the terminal device does not listen for a certain number of MAC frames, after which a MAC frame is sent that is once again heard by the terminal device.

The control center knows when the terminal device is listening and may transmit a message to the terminal device during this particular MAC frame, telling it to monitor subsequent messages. If this does not occur, then the terminal device goes into the sleep mode once again.

This is repeated until either the terminal, i.e. the terminal device, or the control center has a message to transmit.

Between the MAC frames stipulated as the frames during which the terminal will listen, the control center is unable to reach the terminal. Thus, if the control center has a message for a sleeping terminal, it must wait until the terminal is ready once again to receive messages. However, the control center knows precisely when the terminal may be reached once again.

SUMMARY OF THE INVENTION

The process according to the present invention of transmitting messages to terminal devices in a telecommunications system has the advantage over conventional methods in that the control center is able to alter the sleep interval parameter and to introduce the offset parameter. Consequently, it is possible for the control center to group several terminals in the sleep mode together in such a way that they will listen to the broadcast phase in one certain MAC frame. If terminals have different sleep intervals, it is also possible to group terminals having long sleep intervals with terminals having short sleep intervals so that they wake up for the same MAC frame.

It is advantageous if each terminal device group has exactly one terminal device. As a result, the control center may treat each terminal device individually with respect to broadcast messages and multicast messages and the distinction between broadcast-multicast groups and multicast-multicast groups is eliminated.

It is further advantageous if the control center may transmit parameters, such as a sleep interval parameter and an offset parameter, to the terminal devices of one terminal device group, so that all the terminal devices of one terminal device group are prepared to receive messages from the control center during the same, preferably periodically recurring, frame. Thus, by combining several terminal devices into a single terminal device group, the use of transmission resources in the telecommunications network may be reduced.

It is also advantageous if the majority of terminal devices are combined to form a single terminal device group, so that the message to be transmitted may be sent to the majority of the terminal devices during a single, for example the first possible, frame. In this way, the broadcast messages or multicast messages need be sent only once. In this case, all the terminals receive the messages simultaneously. Once again, this minimizes the use of transmission resources. Moreover, the distinction between broadcast-multicast and multicast-multicast groups and the need for terminal coordination are eliminated.

It is also advantageous if the number of terminal device groups to be formed is made dependent, firstly, on the transmission and administration resources available to the telecommunications system and to the control center and/or, secondly, on the expected transmission delay. This achieves a compromise between the use of transmission resources and administration resources when a large number of terminal device groups are used, each of the terminal device groups containing only a few terminal devices, and an extension of the transmission time, caused by allowing for the longest sleep interval parameter of a terminal device in a terminal device group. An additional advantage is achieved if the control center handles this compromise in a flexible manner depending, for example, on the degree to which the capacity of the telecommunications system is being utilized. If the transmission capacity of the telecommunications system is under a very heavy load, then the additional use of resources caused by broadcast or multicast messages may be reduced by utilizing a greater transmission delay. Conversely, broadcast and multicast messages may be processed quickly, for example, if they may be processed during a narrow timeslot.

Moreover, it is advantageous if assignment of a terminal device to a certain terminal device group is communicated by the control center to the terminal device in question by sending it a specifically assigned identifier. Using this code, the terminal device may determine whether a transmitted message is intended for it.

Furthermore, it is advantageous if the message that is to be sent is stored by the control center in a storage device. In this way, a message received may be held ready for transmission until the message has been sent even to the terminal device with the longest sleep interval parameter or a positive response was received from it.

It is also advantageous if a terminal device group has only one terminal device and the message to be sent to the only terminal device in a terminal device group is transmitted by an individual message. In this way, the definition of a terminal device group for a single terminal device is rendered superfluous, since an individual terminal device of this kind receives the message individually.

Moreover, it is advantageous if the message to be transmitted is handled as a broadcast message or broadcast-multicast message in which the majority of terminal devices is formed from all terminal devices assigned particularly to the control center in the cell of a cellular radio network. In this way, all the terminal devices assigned to the control center are reached.

Furthermore, it is advantageous if the message to be transmitted is handled as a multicast message or as a multicast-multicast message that is to be transmitted to the members of a multicast group, so that the majority of terminal devices of all the terminal devices assigned to the control center, particularly in one cell of a cellular radio network, form the multicast group. In this way, it is possible for the message to reach only those terminal devices assigned to a control center that belong to the multicast group for which the message is intended.

The control center according to the present invention has the advantage over the conventional control centers in that the terminal devices are divided into terminal device groups for transmitting broadcast messages and multicast messages. The device selects many terminal devices, in the limiting case all the terminal devices that are to be reached, for transmitting messages while placing a minimal load on system resources and the control center combines the terminal devices that are to be reached into terminal device groups so that the messages are sent in the shortest possible time, individually to each terminal device in the limiting case.

It is particularly advantageous if the control center includes a message selector that separates the messages that are to be sent to several terminal devices assigned to the control center from those that are to be sent individually to a single terminal device assigned to the control center. The advantage of this is that messages intended to be sent individually may be processed more quickly and easily.

The terminal device made according to the present invention has the advantage over conventional terminal devices in that a greater sleep interval parameter for one terminal device does not result in a communications delay for other terminal devices and error-free communications are made possible by the specific assignment of the identifier to a terminal device group.

BRIEF DESCRIPTION OF THE DRAWINGS

FIG. 3 illustrates a first embodiment of a process according to the present invention in operation for sending one message to several terminal devices.

FIG. 4 shows a second embodiment a process according to the present invention in operation for sending a message to several terminal devices.

DETAILED DESCRIPTION

Before going into the actual process involved in the present invention, first the wireless cell in shown FIG. 1 and the frame-based transmission protocol, using a sequence of transmitted frames shown in FIG. 2, will be described.

Figure 1:
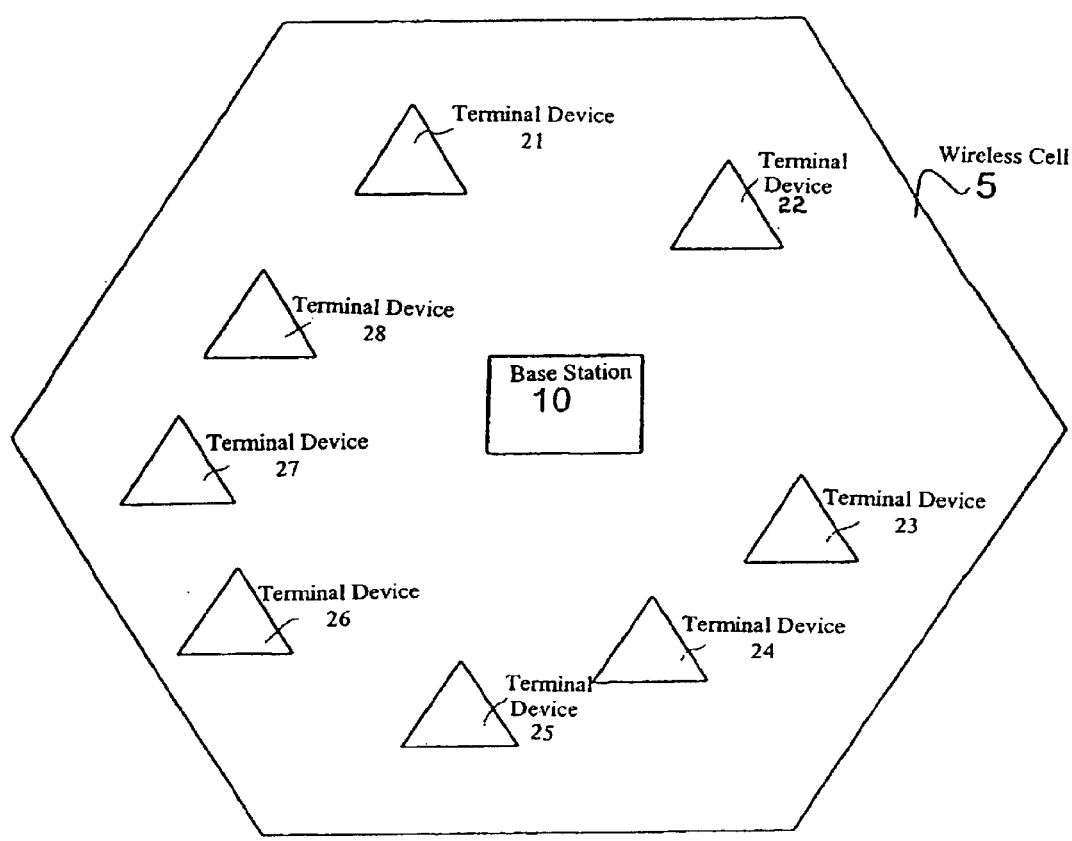
FIG. 1 illustrates a cell in a radio network with a control center and terminal devices.

FIG. 1 shows a wireless cell 5 in a wireless system, such as a cellular mobile wireless system. Wireless cell 5 delineates the coverage area of a base station 10. Terminal devices located within wireless cell 5 communicate within the telecommunications system preferentially through base station 10 since, in general, they are better able to maintain communications with base station 10 than, for example, with a control center assigned to an adjoining cell. FIG. 1, for example, shows eight terminal devices that are assigned to control center 10 in wireless cell 5. The eight terminal devices are designated 21–28. Terminal devices 21–28 are connected by radio link to control center 10.

Before communicating, control center 10 and terminals 21–28 agree on which communication address is to be used and what purpose the connection is to serve. This agreement may be reached explicitly through negotiations or it may be handled in a standard manner using predetermined specifications. A connection may be identified, for example, by combining a MAC address and an explicitly negotiated call identifier. Below, this combination will be called the "service connection identifier" (SCI).

Possible transmission media for the process and devices according to the present invention are a radio frequency channel, a passive optical network, or cable distribution network with coaxial cables and/or optical fibers. The important factor is that one or more terminal devices are served by a central station, for example as shown in FIG. 1. Instead of terminal devices 21–28 a concentrator with several terminal devices may also be used (private branch exchange belonging to the subscriber or network unit belonging to the network operator). The presentation below is made without limiting the general nature of terminal devices 21–28 or terminals 21–28. Control center 10 coordinates communications between control center 10 and terminal devices 21–28. The main medium examined here is a radio frequency channel. Since the system is not bound to a specific place, it is common for terminal devices 21–28 to be, for example, notebook computers or other portable devices that are battery operated. Consequently, current usage is an important selling point for devices of this type.

Figure 2:
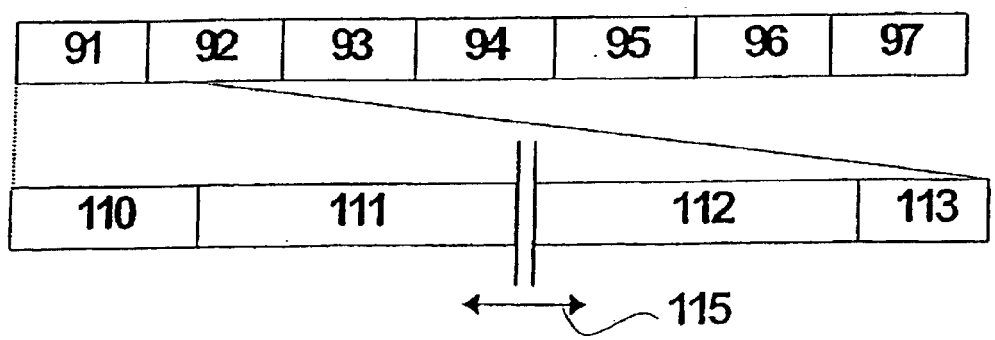
FIG. 2 illustrates a section of time from a series of transmitted frames.

FIG. 2 shows a sequence of transmitted frames 91–97 in the frame-based transmission protocol as they occur in time. Thus, a seventh transmitted frame 97 immediately follows a sixth transmitted frame 96 which, in turn, immediately follows a fifth transmitted frame 95 and so on back to the first transmitted frame 91. Below, frames 91–97 will be referred to indistinguishably as frames 91–97 or MAC frames 91–97. For purposes of a detailed description, transmitted frame 91 is further subdivided into several phases in FIG. 2. Each transmitted frame 91–97 (Media Access Control Frame) preferably lasts a predetermined period of time.

Within this predetermined period of time of a MAC frame 91–97 there exist, for example, a broadcast phase 110, a downlink phase 111, an uplink phase 112, and a random access phase 113. In addition to the phases indicated, for example instead of uplink phase 112 and/or downlink phase 111, it is also possible for a MAC frame 91–97 to have a point-to-point phase (not shown). The order of the individual phases with a MAC frame 91–97 is not necessarily predetermined. Moreover, the duration of the individual phases is not predetermined, although each MAC frame 91–97 preferably has the same duration. In the example described here, broadcast phase 110 is at the beginning of each MAC frame 91–97 During broadcast phase 110, control center 10 transmits information relevant to all terminals 21–28, such as the name and address of control center 10, announcement of transmissions in downlink phase 111 or uplink phase 112, the position of random access phase 113, etc.

In the example shown, broadcast phase 110 is followed by downlink chase 111, which control center 10 uses to transmit information and messages to some of the terminals 21–28. Below, the terms "message," "information," and "report" will be used interchangeably. Thus, a message contains signaling information and/or useful information, e.g. signaling information for communications with terminal devices 21–28 and useful information for the user of a terminal device 21–28 and the like. Taken together, broadcast phase 110 and downlink phase 111 are called the first segment 110, 111 within frames 91–97. In first segment 110, 111, control center 10 sends messages for terminal devices 21–28. First segment 110, 111 need not necessarily be contiguous in time, but may be distributed over several phases of a MAC frame. In the embodiment shown, downlink phase 111 is followed by uplink phase 112 in which individual terminals 21–28 transmit data to control center 10. As depicted by double headed arrow 115, the duration of downlink phase 111 and uplink phase 112 is variable so that when there is a large amount of information that is to be transmitted from control center 10 to terminals 21–28, downlink phase 111 is expanded at the expense of uplink phase 112 and if there is a large amount of information that is to be sent from terminal devices 21–28 to control center 10, then uplink phase 112 is increased with respect to downlink phase 111. In the point-to-point phase (not shown), terminal devices 21–28 may also communicate directly with one another, without first sending information or messages to control center 10. In the embodiment presented, uplink phase 112 is followed by random access phase 113 during which, for example, those terminals 21–28 which were not assigned any uplink capacity during uplink phase 112 may now send information to control center 10. In this phase, they may use random access, for example, to establish new connections and consequently collisions may occur. Similar to the first segment 110, 111 in frames 91–97, the uplink phase 112 and random access phase 113 taken together are referred to as the second segment 112, 113 of frames 91–97, in which messages from terminal devices 21–28 may be sent to control center 10.

Figure 3:
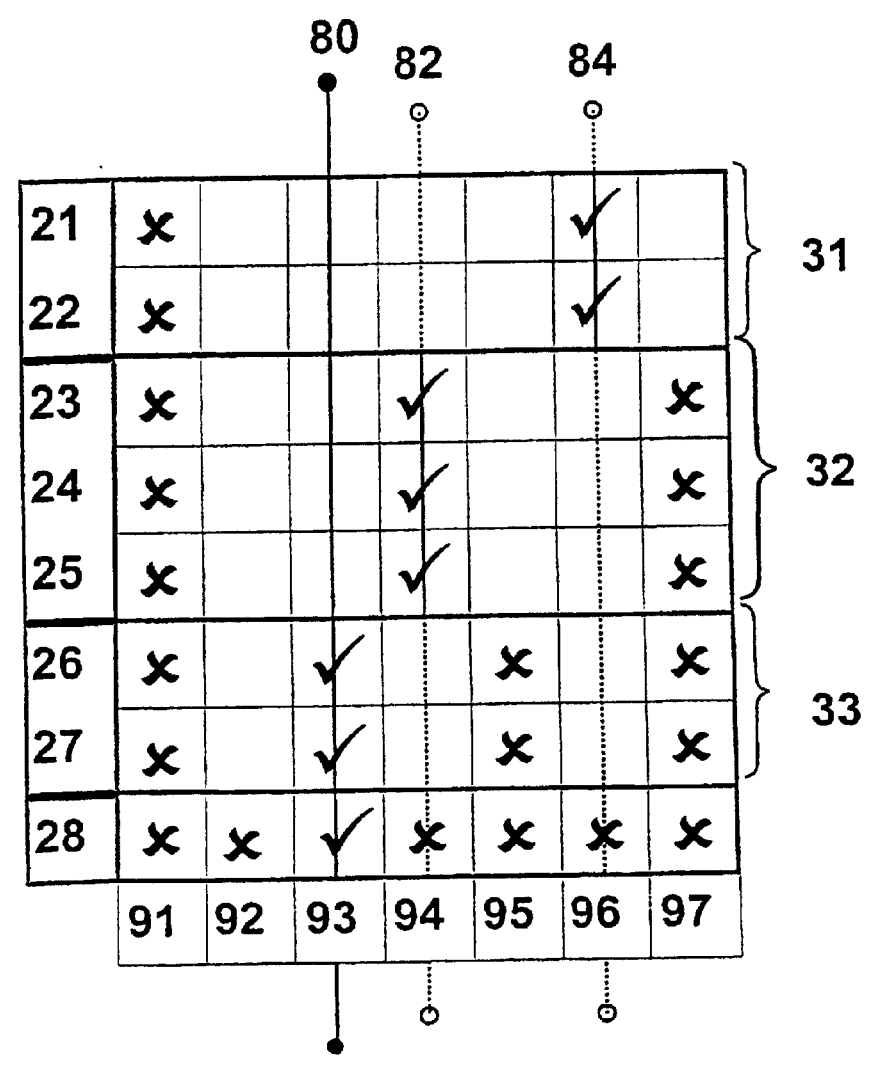
Figure 4:
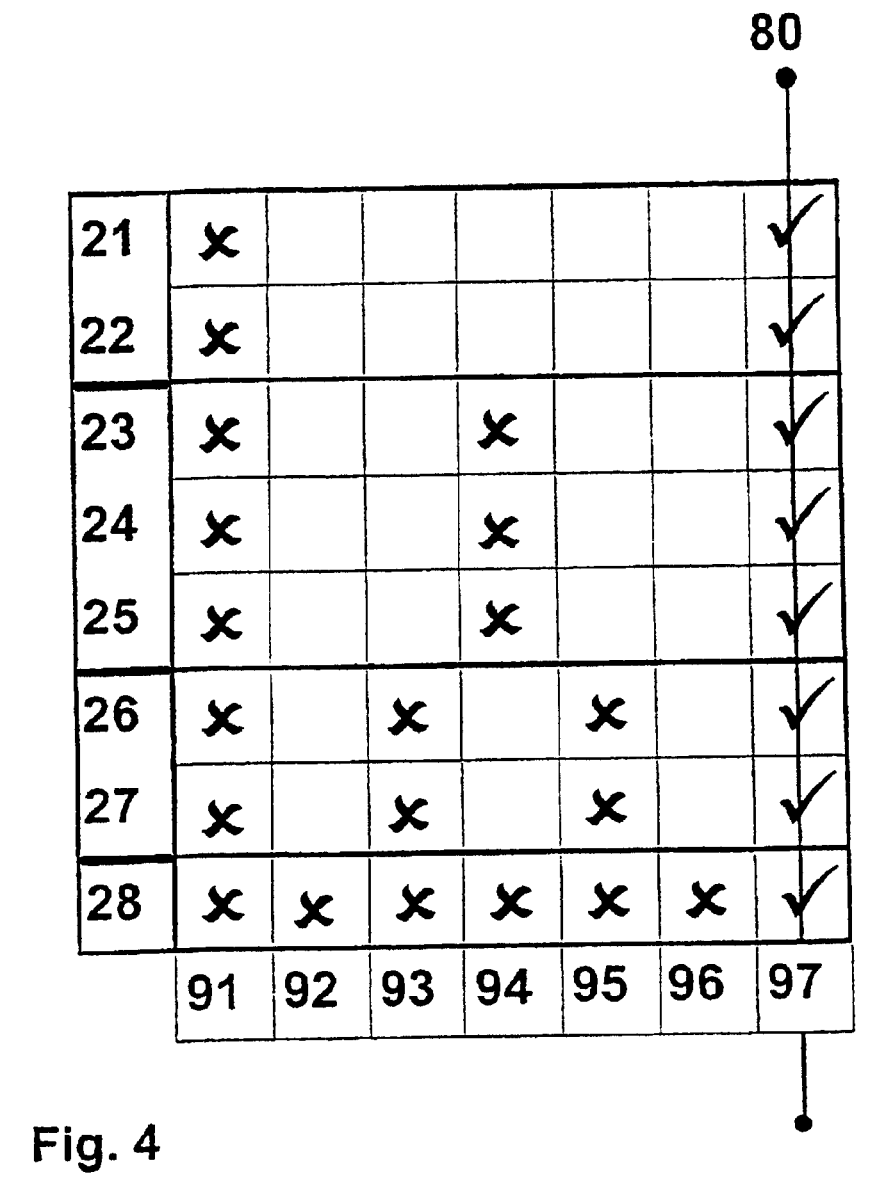

Before the process according to the present invention is described with the help of FIG. 3 and FIG. 4, the following steps will be used to describe power-saving processes in the terminal devices:

Terminal devices 21–28 decide when they will enter sleep mode. Sleep mode in a terminal device 21–28 is characterized by the fact that terminal device 21–28 ignores one or more consecutive MAC frames 91–97. This means, for example, that a receiver unit in terminal device 21–28 remains turned off thereby providing power saving. For this purpose, terminal device 21–28 sends a message to control center 10 indicating that terminal 2128 wants to sleep. In addition, the length of the desired sleep interval is indicated by transmission of a sleep interval parameter. This sleep interval parameter indicates a certain number of MAC frames 91–97 as the sleep interval.

Control center 10 responds with a message confirming that terminal 21–28 may go to sleep. A sleep interval (which may differ from the requested interval) and an offset interval are indicated. The offset parameter indicates after how many MAC frames 91–97 terminal 10 should begin counting the sleep interval. Subsequently, both control center 10 and terminal 21–28 use the value indicated in the response by control center 10 as the duration of the sleep interval.

Now the terminal begins to count the MAC frames 91–97, beginning with the MAC frame 91–97 indicated by the offset parameter. Once the sleep interval has elapsed, terminal 21–28 listens for broadcast phase 110 within a MAC frame 91–97. During broadcast phase 110, control center 10 transmits messages of relevance to all terminals 21–28, such as the name and address of control center 10, announcement of transmissions in other phases of MAC frame 91–97, and the position of a random access phase 113.

From the offset parameter and the sleep interval parameter, control center 10 knows when terminal 21–28 will be listening. If control center 10 has a message for this terminal 21–28, it sends a wakeup signal to terminal 21–28 during broadcast phase 110 of this MAC frame 91–97. If control center 10 has no message to send, no notification is given to terminal 21–28.

If terminal 21–28 has nothing to receive, it returns to the sleep mode, once again counting MAC frames 91–97 in accordance with the sleep interval, beginning with a starting value such as 0 or 1. When the sleep interval is over, terminal device 21–28 listens once again for broadcast phase 110 from control center 10.

This process is repeated until either terminal 21–28 or control center 10 has a message to transmit.

Between the MAC frames 91–97 during which terminal 21–28 has agreed to listen, control center 10 has no way of reaching terminal 21–28. Thus, if it has a message for a sleeping terminal 21–28, it waits until terminal 21–28 monitors broadcast phase 110 once again. On the other hand, control center 10 knows precisely when terminal 21–28 may be reached again.

With the sleep interval parameter and the offset parameter, it is possible for the control center to group several terminal devices 21–28 that are in sleep mode in such a way that will monitor the broadcast phase 110 during the same MAC frame 9197. Thus, if terminal devices 21–28 have different sleep intervals, it is possible to utilize the sleep interval parameter and the offset parameter to control those terminals 21–28 with long sleep intervals and those terminals 21–28 with short sleep intervals in such a way that there are MAC frames 91–97 in which all such terminals 21–28 will monitor broadcast phase 110. This is possible, for example, if the sleep interval of one terminal 21–28 is twice as long as the sleep interval of another terminal 21–28.

Control center 10 ensures that all terminal devices 21–28 receive all broadcast messages and that all terminals 21–28 belonging to a multicast group receive multicast messages. One problematic case occurs when one or more terminals 21–28 in a wireless cell are sleeping, i.e. when these terminals 21–28 do not hear the broadcast phase 110 of many MAC frames 91–97. In this case, it is not reasonable for control center 10 to retransmit this message as soon as the center receives it, since it is clear from the beginning that several terminals 21–28 will not receive the message. Further, repeating the message until it is certain that each terminal 21–28 has received the message is not a good solution. In this case, one terminal 21–28 could receive the broadcast message several times and respond to it several times. For some message types, this is to be avoided and with other types it is undesirable, to say the least, since it would result in unwanted additional traffic within wireless cell 5 and in the network.

The present invention combines the power-saving process with the intelligent transmission of broadcast messages and multicast messages using the MAC protocol. However, the present invention is not limited to the use of the MAC protocol. All frame-structured transmission protocols may be used. With the process according to the present invention, all terminals 21–28 that are associated with a control center 10 receive all broadcast messages and multicast messages, while no individual terminal receives the message more than once.

The broadcast messages and multicast messages described here are not to be confused with broadcast phase 110 of a MAC frame 91–97. Broadcast reports in data networks are reports that are not directed toward a specific terminal 21–28, but to all terminals 21–28 that are able to receive the message, such as all those within a subnetwork or within a wireless cell. These reports are sent to a layer in the receiver that is above the MAC layer. They are used, for example, when a terminal wants to find out the IEEE MAC address of a terminal with a certain address on a higher level, such as the IP address. Such broadcast messages generally require that one, several, or all terminals that hear the broadcast message send a response to the sender, i.e. in general to control center 10. They are of great importance to the operation of a LAN (Local Area Network).

Multicast messages are messages that are to be transmitted by a sender only to a certain subgroup of all terminals 21–28 that are within range. Unlike broadcast messages, the exchange of multicast messages are to be preceded by an agreement phase, during which membership of the terminal in a multicast group is agreed on or negotiated. It is also possible for a terminal to join a multicast group at a later time.

In contrast, the broadcast phase of the MAC frame is intended primarily for controlling data exchange on the MAC level. These messages are terminated within the MAC layer, i.e. they are evaluated there and are not sent up to a higher layer. It also makes sense, however, to send broadcast messages from higher layers of the OSI model in the broadcast phase of the MAC protocol.

FIG. 3 presents one embodiment of an addressing scheme for the process according to the present invention. The process employs multicast groups for sending broadcast messages. For this purpose, the control center assigns a terminal that is entering a power-saving mode to one or more multicast groups and informs the terminal of its membership in this one or these several groups. If a broadcast message is to be sent, the control center sends this message to all the individual multicast groups formed in this way, thereby making sure that each terminal receives the report as quickly as possible and receives it exactly once.

The process may be used for transmitting broadcast messages and for transmitting multicast messages.

Broadcast messages are transmitted here using multicast groups, although here these groups refer to exactly one wireless cell. Conventional multicast groups may extend across wireless cells and may be defined, for example, on the IP or Ethernet level.

For broadcast purposes, terminals that wake up at the same time are combined to form multicast groups and will be called B-multicast groups or broadcast-multicast groups below, to distinguish them. Information sent to a B-multicast group need be sent only once to be received by all members of the B-multicast group. Consequently, it is important to assign to a B-multicast group only those terminals that are in sleep mode and that always wake up at the same time. As a result, care should be taken to assign each terminal to exactly one B-multicast group.

The broadcast messages are characterized by a certain service connection identifier (SCI) as broadcast information. A certain combination of MAC identification (MAC ID) and call identifier, known to all the terminals of a B-multicast group and to control center 10, is reserved for this purpose. The B-multicast groups are administered within control center 10 and they are also identified by a certain SCI. The control center assigns SCIs to the multicast groups and it also assigns terminals to these groups. In this way, both control center 10 and terminals 21–28 know which SCIs are reserved for broadcast purposes. A terminal is assigned to a B-multicast group when control center 10 sends that terminal a parameter of the B-multicast group, the "SCI of the B-multicast group." Below, this parameter will also be called the identifier of the B-multicast group. During the exchange of information that occurs when a terminal enters the sleep mode, this identifier is transferred in that the control center transmits an identifier of this kind in its response to the sleep mode request.

Not all terminals in a wireless cell are affected identically when a multicast message is transmitted. It may be that none, one, several, or all the terminals belong to a certain multicast group. Here, too, control center 10 is to make sure that each affected terminal receives the message precisely once. According to the present invention, exactly the same process is used for correct transmission of multicast messages to the terminal device in question as is used for broadcast messages. Thus, terminal device groups 31–33 are formed within the multicast group in question. Subsequently, these groups will be called M-multicast groups or multicast-multicast groups. The only difference is in the number of terminal devices involved. In the case of a multicast message, all terminal devices in the coverage area of a control center are affected by the broadcast message. With a multicast message, in general only some of the terminal devices of a wireless cell 5 are affected, namely those that belong to the multicast group in question. In either case, however, precisely the same process is carried out for the set of terminal devices that are affected by a message. Consequently, no distinction will be made below between messages, broadcast messages, multicast messages, and broadcast-multicast messages.

The control center transmits messages in accordance with the following rules:

When control center 10 receives a broadcast message that is to be sent to all or some of the terminals 21–28 in wireless cell 5, it stores the message.

It sends the message in a subsequent MAC frame 91–97 as a broadcast message. It knows precisely which terminals are prepared for reception. Those terminals 21–28 that receive the message as a broadcast message may either be active or belong to a B-multicast group 31–33, which is prepared for reception during this MAC frame 91–97. A B-multicast group or broadcast-multicast group 31–33 is a terminal device group 31–33 whose terminal devices are ready to receive in the same MAC frame 91–97. The designation B-multicast group or broadcast-multicast group 31–33 results from the fact that such a terminal device group 31–33 is formed for transmitting a broadcast message, although it is handled as a group of terminal devices that belong to a multicast group 31–33. Control center 10 assumes that B-multicast group 31–33, which is ready for reception during this MAC frame 91–97, has received the message.

The control center sends the broadcast message to the remaining B-multicast groups 31–33 in the MAC frames 91–97 in which these groups are ready for reception. This occurs until all B-multicast groups 31–33 with more than one terminal 21–28 have received the broadcast message.

Individual terminals that do not belong to a B-multicast group of terminal devices because, for example, their sleep interval parameter is too great to assure effective information transmission, are handled either as if they formed a B-multicast group of their own containing only a single terminal device or the message is transmitted to terminal devices of this kind individually, i.e. in a terminal-device-specific transmission.

Terminals 21–28 behave in accordance with the following rules:

All active terminals and those that, due to their sleep interval, are ready for reception during the same MAC frame 91–97 in which the message to be transmitted has been included by control center 10 receive either a broadcast message or a broadcast-multicast message.

If a terminal is ready for reception and recognizes a broadcast message as a message, this message is received by the terminal.

If the terminal receives no broadcast message, but receives a B-multicast message, and the terminal belongs to this B-multicast group, it receives the B-multicast message. Otherwise, it receives no broadcast message.

The first embodiment, depicted in FIG. 3, is related to the situation in FIG. 1 and, by way of example, it includes 8 terminals 21–28 that are located in the same wireless cell 5. The horizontal axis of the diagram in FIG. 3 represents the passage of time in communications between control center 10 and terminals 21–28. The vertical axis shows terminals 21–28. Of the eight terminals 21–28, the first seven terminals 21–27 are in sleep mode and one, namely eighth terminal 28, is in active mode. Control center 10 has divided the seven sleeping terminals 21–27 into three B-multicast groups 31–33. The first terminal 21 and the second terminal 22 together form the first terminal device group 31. Thus, the first two terminals 21, 22 are ready for reception every five MAC frames 91–97. The third through fifth terminals 23–25 form the second terminal device group 32. The terminal devices in the second terminal device group 32 are ready to receive information from the control center every third MAC frame 91–97. The third terminal device group 33 is comprised of the sixth terminal device 26 and the seventh terminal device 27. The sixth terminal device 26 and the seventh terminal device 27 are ready in every other MAC frame 91–97. The active eighth terminal 29 is able to receive messages in every frame 91–97. A terminal's readiness to receive information in a MAC frame 91–97 is indicated by a cross or checkmark at the intersection of the axes in the diagram for the terminal device and the MAC frame in question. Here, a cross indicates the basic readiness of a terminal. 21–28 for reception and a checkmark shows both its basic readiness and the fact that a message has actually been received. In the first embodiment, a message has been received by the control center in the third MAC frame 93, as indicated by a first line 80 in the third MAC frame 93. The message thus received is addressed to all terminals as a broadcast message. However, the broadcast message may be received only by the active eighth terminal 29 and by terminal devices 26, 27 of the third terminal device group 33, which are prepared for reception during third MAC frame 93. Consequently, for third MAC frame 93 checkmarks indicating successful reception of the transmitted message are shown in the diagram in FIG. 3 at the levels of the sixth, seventh, and eighth terminal devices 26–28. At this point, control center 10 assumes that eighth terminal device 28 and third terminal device group 33 have received the broadcast message. The next possible time at which additional terminal devices 21–28 may be reached is during fourth MAC frame 94. During this MAC frame second terminal device group 32 is ready to receive messages. Consequently, control center 10 sends a B-multicast message 82 to second terminal device group 32 during fourth MAC frame 94. This message is addressed exclusively to the members of this group, as indicated by line 82 in fourth MAC frame 94. This is drawn as a dotted line for all terminal devices 21–28 except for third, fourth, and fifth terminal devices 23–25. The same applies to a third line 84 and first terminal device group 31 in sixth MAC frame 96. In fifth MAC frame 95, the only terminals that are ready for reception have already received the message. As a result, no message is sent at this point. After the sixth MAC frame 96, all terminals 21–28 have received the message, i.e. the broadcast message has been fully transmitted.

FIG. 4 shows a second embodiment of the process according to the present invention. The second embodiment corresponds to an extreme case of the first embodiment. In the second embodiment control center 10 assigns appropriate sleep interval parameters and offset parameters to the terminal devices to make sure that all terminal devices 21–28 are ready for reception during the same MAC frame. During precisely this MAC frame control center 10 sends the message that is to be transmitted. FIG. 4 shows an example of this behavior. The sleep interval of the first and second terminal devices 21, 22 is 6 MAC frames, the sleep interval of the third, fourth, and fifth terminal devices 23–25 corresponds to three MAC frames, the sleep interval of the sixth and seventh terminal devices 26, 27 corresponds to two MAC frames, and the eighth terminal device 28 is active, so it may be reached during any MAC frame. It is further assumed that all terminal devices 21–28 are ready for reception during the first MAC frame 91 and that a broadcast message is received by control center 10 during the third MAC frame 93, as indicated by first line 80. The next MAC frame after the third MAC frame 93 during which all terminal devices 21–28 are ready for reception is the seventh MAC frame 97. The broadcast message is sent out to all terminal devices 21–28 simultaneously during this frame. In this way, it is no longer necessary to divide the terminal devices into terminal device groups since there is just one group, so to speak, because all terminals are awake and ready for reception at the same time. Control center 10 stores the broadcast message in this example for the time between the third MAC frame 93 and the seventh MAC frame 97 and then transmits it when all terminals are awake. The advantage of this process is that the broadcast message is sent only once and all terminals receive the broadcast message simultaneously. This minimizes the use of transmission resources. Moreover, the definition of B-multicast groups and the need to assign terminals 21–28 to them are eliminated. The significant disadvantage of this process is that, especially with very long sleep intervals, for example on the order of several seconds for some terminals, the broadcast message is received by those terminals at a very late time. This may lead to significant delays at the remote station on the network and in some cases in timeouts, which may result in repeated transmission of the broadcast message.

In the other extreme case (not shown) of the first embodiment, the control center sends each broadcast message individually to each terminal 21–28. The advantage of this process is that control center 10 may treat each terminal 21–28 individually with respect to broadcasts and the definition of B-multicast groups is eliminated. The disadvantage, of course, is that control center 10 has more administrative overhead for terminal devices 21–28, which are handled individually and more transmission capacity is required, since the broadcast message is to be sent individually for each terminal.

The first embodiment of the process according to the present invention represents a compromise between the two extreme embodiments of the process in the present invention described above. In the first embodiment it is important that control center 10 perform maximal grouping of terminals 21–28. That is, the control center 10 ensures as many terminals 21–28 as possible are ready for reception at the same time, during a certain MAC frame 91–97. In this way, an acceptable compromise may be reached between the optimal, i.e. longest possible, sleep intervals, at least for some terminals 21–28, and a large number of terminals grouped into terminal device groups 31–33 that results in the use of fewer transmission resources in the telecommunications system, since all terminal devices in a terminal device group receive the message simultaneously.

Figure 5:
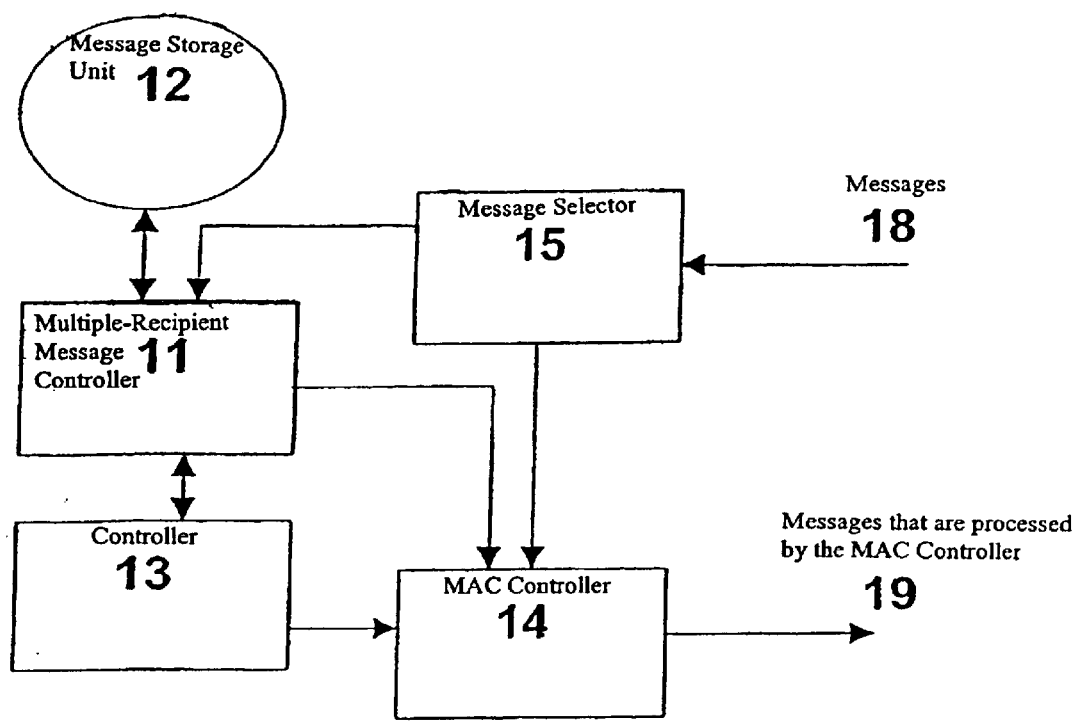
FIG. 5 illustrates a block diagram of a telecommunications control center according to the present invention.

FIG. 5 shows a block diagram of the section of a control center 10 that is relevant to the process according to the present invention. The control center 10 according to the present invention includes a multiple-recipient message controller 11 that processes those messages that are to be sent to several terminals 21–28 assigned to control center 10. Further, control center 10 has a message storage unit 12 and a controller 13 for implementing power-saving measures on the part of terminal devices 21–28. Message storage unit 12 and controller 13 are connected to the multiple-recipient message controller. Moreover, the control center 10 according to the present invention includes a MAC controller 14, which assures that information and messages are compiled in accordance with the transmission protocol, such as the MAC protocol. Both multiple-recipient message controller 11 and controller 13 are connected to MAC controller 14. In a particularly advantageous embodiment the control center 10 made according to the present invention also includes a message selector 15, which separates the messages that are to be sent to several terminal devices 21–28 assigned to control center 10 from those that are to be sent individually to a single terminal device 21–28 assigned to control center 10. Message selector 15 is connected to multiple-recipient message controller 11 and MAC controller 14. Information or messages 18 arriving from the telecommunications network are delivered to message selector 15. It forwards broadcast and multicast messages to multiple-recipient message controller 11. All other messages are sent directly to MAC controller 14. Controller 13 for power-saving measures on the part of the terminal devices influences multiple-recipient message controller 11 and MAC controller 14. Controller 13 for power-saving in terminal devices 21–28, together with the multiple-recipient message controller, is responsible for dividing terminal devices 21–28 into broadcast-multicast groups and multicast-multicast groups and for communicating this to terminals 21–28 during the exchange of information that results in the transition of a terminal 21–28 in the sleep mode. When a broadcast message or multicast message arrives, it is sent to multiple-recipient message controller 11, which stores this message in message storage unit 12, if necessary. Multiple-recipient message controller 11 receives information from controller 13 indicating when which terminals 21–28 or broadcast-multicast groups 31–33 and multicast-multicast groups (31–33) are ready for reception and it delivers the corresponding messages at the proper time, using the process described above in accordance with the first or second embodiment, to MAC controller 14, which is responsible for sending out the messages. Messages that are processed by MAC controller 14 in such a way that they may be delivered to a transmitter (not shown) at control center 10 are indicated by 19. This implementation may also be used for the other extreme solution described above. In all the processes described, the multiple-recipient message controller needs information from controller 13 indicating when it should send which message, in order to assure, first, that all terminal devices that should receive a multiple-recipient message actually receive it and, secondly, that no terminal device receives such a multiple-recipient message more than once.

According to the present invention, transmission media other than radio may also be used. The important point is for the MAC protocol and the power-saving process to be similar to those described above. This assumes that terminals 21–28 and control center 10 access a common medium to which access is centrally controlled by control center 10. Thus, passive optical networks and hybrid fiber-optic/coax networks are possible.

Moreover, the control center need not necessarily be connected to an outside telecommunications network. In this case, the terminals may communicate only among themselves. Here, too, broadcast and multicast are normally used. In the process described above, all communications are routed through the control center, i.e. even when two terminals within a wireless cell communicate with each other, the message is first sent to the control center, which then forwards it to its final address. It is also possible, however, for terminals to communicate directly with one another while the control center still coordinates communications during this. The process described above should also be used in this case. For this purpose, terminals 21–28 never send broadcast and multicast messages directly to another terminal 21–28, but always follow the path through the control center. The control center duplicates the message and sends it in accordance with the process described above to terminals 21–28 in the wireless cell and possibly on to the network environment.

What is claimed is:

1. A process for transmitting messages to a plurality of terminal devices in a telecommunications system having a control center that uses a protocol that is frame-structured in a time domain, comprising the steps of:

causing the control center to transmit a message to the terminal devices in a first segment within a plurality of frames by performing the steps of:

combining a group of the terminal devices into at least one terminal device group, a number of the at least one terminal device group being formed by a majority of the terminal devices, each of the terminal devices belonging to only one of the at least one terminal device group, preparing all of the terminal devices of one of the at least one terminal device group to receive messages from the control center during a single frame, all of the terminal devices of the one of the at least one terminal device group ignoring messages from the control center during a frame other than the single frame, and preparing the terminal devices of the remaining of the at least one terminal device group to receive messages during a frame other than the single frame, the terminal devices of the remaining of the at least one terminal device group ignoring messages from the control center during the single frame, and for each of the at least one terminal device group if there is a message to be transmitted, transmitting the message to be transmitted to all of the terminal devices of the one of the at least one terminal device group only during the single frame and transmitting the message to be transmitted to the terminal devices of the remaining of the at least one terminal device group only during the frame other than the single frame; and causing the control center to receive a message from the terminal devices in a second segment within the frames, the terminal devices ignoring the message transmitted by the control center during one of a single frame and successive frames.

2. The process according to claim 1, wherein the telecommunications system is a wireless telecommunications system.

3. The process according to claim 1, wherein the frames are MAC frames.

4. The process according to claim 1, wherein the single frame is periodically recurring.

5. The process according to claim 1, wherein the possible single frame is the first possible single frame.

6. The process according to claim 1, wherein each of the at least one terminal device group includes one terminal device.

7. The process according to claim 1, further comprising the step of:

assigning parameters to the terminal devices of each of the at least one terminal device group by the control center so that the terminal devices of each of the at least one terminal device group are ready to receive messages from the control center during the single frame.

8. The process according to claim 7, wherein the parameters include a sleep interval parameter and an offset parameter.

9. The process according to claim 7, wherein the single frame is periodically recurring.

10. The process according to claim 1, further comprising the steps of:

combining the majority of the terminal devices to form one terminal device group;

transmitting the message to be transmitted to the majority of the terminal devices during one of the frames.

11. The process according to claim 10, wherein the single frame is the first possible frame.

12. The process according to claim 1, wherein there is a number of the at least one terminal device group to be formed, the number of the at least one terminal device group to be formed being dependent on at least one of:

transmission and administration resources of the telecommunications system and the control center, and an expected transmission delay.

13. The process according to claim 1, further comprising the step of:

announcing an assignment of one of the terminal devices to a particular one of the at least one terminal device group by transmitting an identifier from the control center to the one of terminal devices, the identifier being unique to the particular one of the at least one terminal device group.

14. The process according to claim 1, further comprising the step of:

storing the message to be transmitted by the control center in a message storage unit.

15. The process according to claim 1, wherein one of the at least one terminal device group includes only one terminal device, the message to be transmitted being transmitted to the one terminal device of the one of the at least one terminal device group as an individual message.

16. The process according to claim 1, further comprising the step of:

handling the message to be transmitted as one of a broadcast message and a broadcast-multicast message, the majority of the terminal devices being formed of all terminal devices assigned to the control center.

17. The process according to claim 16, wherein the control center is in one wireless cell in a cellular wireless network.

18. The process according to claim 1, further comprising the step of:

handling the message to be transmitted as one of a multicast message and a multicast-multicast message that is to be transmitted to the terminal devices of a multicast group, the majority of the terminal devices being formed of members of the multicast group assigned to the control center.

19. The process according to claim 18, wherein the control center is in one wireless cell in a cellular wireless network.

20. A control center for transmitting messages to a plurality of terminal devices in a telecommunications system, comprising:

an arrangement for transmitting a message to the terminal devices in a first segment within a plurality of frames, the arrangement for transmitting including:

an arrangement for combining a group of the terminal devices into at least one terminal device group, a number of the at least one terminal device group being formed by a majority of the terminal devices, each of the terminal devices belonging to only one of the at least one terminal device group, an arrangement for preparing all of the terminal devices of one of the at least one terminal device group to receive messages from the control center during a single frame, all of the terminal devices of the one of the at least one terminal device group ignoring messages from the control center during a frame other than the single frame, and preparing the terminal devices of the remaining of the at least one terminal device group to receive messages during a frame other than the single frame, the terminal devices of the remaining of the at least one terminal device group ignoring messages from the control center during the single frame, and an arrangement for transmitting, if there is a message to be transmitted for each of the at least one terminal device group, the message to be transmitted to all of the terminal devices of the one of the at least one terminal device group only during a possible the single frame and transmitting the message to be transmitted to the terminal devices of the remaining of the at least one terminal device group only during the frame other than the single frame;

an arrangement for receiving a message from the terminal devices in a second segment within the frames, the terminal devices ignoring the message transmitted by the control center during one of a single frame and successive frames;

a multiple-recipient message controller that handles messages to be sent to several terminal devices assigned to the control center;

a message storage unit; and a controller for implementing power saving measures.

21. The control center according to claim 20, wherein the telecommunications system is wireless.

* * * * *